US012643442B2

(12) United States Patent
Fang

(10) Patent No.: US 12,643,442 B2
(45) Date of Patent: Jun. 2, 2026

(54) BUFFER STRUCTURE FOR SUPPORT LEG, BASE ASSEMBLY, AND CHILD SAFETY SEAT

(71) Applicant: WONDERLAND SWITZERLAND AG, Steinhausen (CH)

(72) Inventor: Ganqing Fang, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 251 days.

(21) Appl. No.: 18/387,956

(22) Filed: Nov. 8, 2023

(65) Prior Publication Data

US 2024/0149760 A1 May 9, 2024

(30) Foreign Application Priority Data

Nov. 9, 2022 (CN) .......................... 202211399083.7

(51) Int. Cl.
*B60N 2/28* (2006.01)
(52) U.S. Cl.
CPC ......... *B60N 2/2893* (2013.01); *B60N 2/2821* (2013.01); *B60N 2/289* (2013.01)
(58) Field of Classification Search
CPC .. B60N 2/289; B60N 2002/2896; B60N 2/28; B60N 2/2824; B60N 2/2821; B60N 2/26; A47C 4/10; A47C 4/20
USPC .................................................. 297/423.28
See application file for complete search history.

(56) References Cited

U.S. PATENT DOCUMENTS 1,390,842 A * 9/1921 Szostek .................. A47C 4/045
                                                              108/130
2005/0264062 A1 12/2005 Longenecker et al.
2018/0251051 A1 9/2018 Anderson et al.

FOREIGN PATENT DOCUMENTS

CN        110281821 A  * 9/2019 .......... B60N 2/2824
CN        209534831 U    10/2019
CN        213553392 U  * 6/2021
CN        216374308 U    4/2022
WO        2018054249 A1   3/2018
WO        2022243508 A1  11/2022

OTHER PUBLICATIONS

European Application No. 23208694.2; Extended European Search Report dated Mar. 19, 2024; 9 pages.
Taiwanese Application No. 112142970; First Office Action w english translation dated Jul. 29, 2024; 16 pages.

* cited by examiner

*Primary Examiner* — Milton Nelson, Jr.
(74) *Attorney, Agent, or Firm* — CANTOR COLBURN LLP

(57) ABSTRACT

The present disclosure provides a buffer structure for a support leg of a child safety seat. The buffer structure is located at a connecting portion between the support leg and a base, and when the support leg rotates from an unfolded state to a folded state or from the folded state to the unfolded state with respect to the base, the buffer structure interferes with rotation of the support leg, thereby slowing down the rotation of the support leg. The disclosure also relates to a base assembly and a child safety seat.

26 Claims, 10 Drawing Sheets

1

1

1

1

1

1

310

320

1

BUFFER STRUCTURE FOR SUPPORT LEG, BASE ASSEMBLY, AND CHILD SAFETY SEAT

CROSS-REFERENCE TO RELATED APPLICATIONS

This application claims priority to Chinese Application No. 2022113990837, filed on Nov. 9, 2022, which is incorporated herein by reference in its entirety.

TECHNICAL FIELD

The present disclosure relates to a buffer structure for a support leg, a base assembly, and a child safety seat.

BACKGROUND

A child safety seat is generally provided with a support leg structure. When in use, the support leg contacts with the vehicle floor, which can effectively ensure the stability of the child safety seat, meanwhile, in order to facilitate packaging and transporting the child safety seat, the support leg is rotatably connected to the base. When the support leg is not used, it can be folded at the bottom of the child safety seat. However, when the support leg is unfolded or folded, it will collide with the seat, generating noise and affecting the consumer experience.

SUMMARY

According to the present disclosure, a buffer structure for a support leg of a child safety seat is provided. The buffer structure is located at a connecting portion between the support leg and a base, and when the support leg rotates from an unfolded state to a folded state or from the folded state to the unfolded state with respect to the base, the buffer structure interferes with the rotation of the support leg, thereby slowing down rotation of the support leg.

According to an embodiment of the disclosure, the buffer structure includes: a base-side pivoting device, pivotably connected to the base and being cooperating with a support leg side jointing device of the support leg pivotably connected to the base.

According to an embodiment of the disclosure, the buffer structure includes: a fixed rod, transversely passing through and being fixed to a support leg connecting portion of the base for connecting to the support leg, wherein the base-side pivoting device is pivotably sleeved on the fixed rod, and the support leg side jointing device is pivotably connected to the support leg connecting portion.

According to an embodiment of the disclosure, jointing teeth distributed in a circumferential direction are arranged on the base-side pivoting device, jointing teeth distributed in the circumferential direction are correspondingly arranged on the support leg side jointing device, and the jointing teeth on the base-side pivoting device and the jointing teeth on the support leg side jointing device are configured to be engaged to each other.

According to an embodiment of the disclosure, the jointing teeth on the base-side pivoting device are distributed along an entire circumference.

According to an embodiment of the disclosure, the jointing teeth on the base-side pivoting device are uniformly distributed along a circumference.

According to an embodiment of the disclosure, the jointing teeth on the support leg side jointing device are distributed along a portion of a circumference.

According to an embodiment of the disclosure, the jointing teeth on the support leg side jointing device are uniformly distributed along a circumference.

According to an embodiment of the disclosure, the buffer structure further includes: a buffer member, abutting against the base-side pivoting device and slidable with respect to the base-side pivoting device along an axial direction of the base-side pivoting device.

According to an embodiment of the disclosure, the buffer member is not capable of rotating with respect to the base-side pivoting device.

According to an embodiment of the disclosure, the buffer structure further includes: a reset member, arranged on a side of the buffer member facing away from the base-side pivoting device for biasing the buffer member toward the base-side pivoting device.

According to an embodiment of the disclosure, the buffer structure further includes: a buffer member, opposed to the base-side pivoting device along an axial direction of the base-side pivoting device, and slidable with respect to the base-side pivoting device along the axial direction of the base-side pivoting device, wherein an opposing surface of the buffer member is pressed against an opposing surface of the base-side pivoting device.

According to an embodiment of the disclosure, the buffer structure further includes: a reset member, arranged on a side of the buffer member facing away from the base-side pivoting device for biasing the buffer member toward the base-side pivoting device.

According to an embodiment of the disclosure, the buffer structure further includes: a reset member, arranged on a side of the buffer member facing away from the base-side pivoting device for biasing the buffer member toward the base-side pivoting device.

According to an embodiment of the disclosure, the buffer structure further includes: a positioning member, fixed on the fixed rod for positioning the reset member.

According to an embodiment of the disclosure, the positioning member is arranged on an end side of the fixed rod, and the reset member is arranged between the buffer member and the positioning member.

According to an embodiment of the disclosure, the reset member is a coil spring sleeved on an end of the fixed rod; and the positioning member has a head and a connecting rod, the head abuts against one end of the reset member, and the connecting rod serves to connect and fix the positioning member to the fixed rod.

According to an embodiment of the disclosure, on the side of the buffer member facing away from the base-side pivoting device, the buffer member has a reset member receiving portion for receiving and fixing the other end of the reset member.

According to an embodiment of the disclosure, the buffer member has bulge on the opposing side of the buffer member, the base-side pivoting device has a recess at a corresponding position on the opposing side of the base-side pivoting device, and the bulge and the recess are embedded to each other.

According to an embodiment of the disclosure, on opposing sides of the buffer member and the base-side pivoting device, there are engaging teeth alternate convex and concave respectively.

According to an embodiment of the disclosure, the engaging teeth extend radially.

According to an embodiment of the disclosure, the engaging teeth are uniformly distributed in the circumferential direction.

According to an embodiment of the disclosure, the engaging teeth on the opposing side of the buffer member and the engaging teeth on the opposing side of the base-side pivoting device have different distribution densities in the circumferential direction.

According to an embodiment of the disclosure, two ends of the fixed rod protrude from two sides of the support leg connecting portion respectively, and the base-side pivoting device and the buffer member are sequentially arranged at the two ends of the fixed rod from inside to outside respectively.

According to an embodiment of the disclosure, a diameter of a gear with the jointing teeth of the base-side pivoting device is smaller a diameter of a gear with the jointing teeth of the support leg side jointing device.

According to the disclosure, a base assembly is provided, which includes: a base; a support leg, pivotably connected to the base and having an unfolded state and a folded state with respect to the base; and the buffer structure according to the disclosure.

According to an embodiment of the disclosure, the support leg is pivotably connected to the support leg connecting portion of the base through a fixing device, and the fixing device is connected to the support leg side jointing device or constitutes the support leg side jointing device.

According to the disclosure, a child safety seat is provided. The child safety seat includes the base assembly according to the disclosure.

DETAILED DESCRIPTION

Although the disclosure is illustrated and described herein with reference to specific embodiments, the disclosure should not be limited to the details shown. Specifically, within the scope of the equivalent solutions of the claims and without departing from the disclosure, varieties of modifications can be made to these details.

The directional descriptions related herewith, such as "front," "back," "up," and "down" and the like, are only for convenience of understanding, and the disclosure is not limited to these directions, but can be adjusted according to the actual situation. Moreover, although this application has been listed and described with reference to typical embodiments, the terms used is illustrative and exemplary, rather than restrictive.

According to the disclosure, a child safety seat includes a seat and a base assembly, a support leg is pivotably connected to a base, and a buffer structure for slowing down rotation of the support leg is arranged between the support leg and the base. When the support leg is unfolded or folded, the buffer structure can slow down the rotation speed of the support leg, thereby effectively reducing the noise caused by the impact of rapid movement when the support leg is unfolded or folded, and improving the consumer experience.

Figure 1:
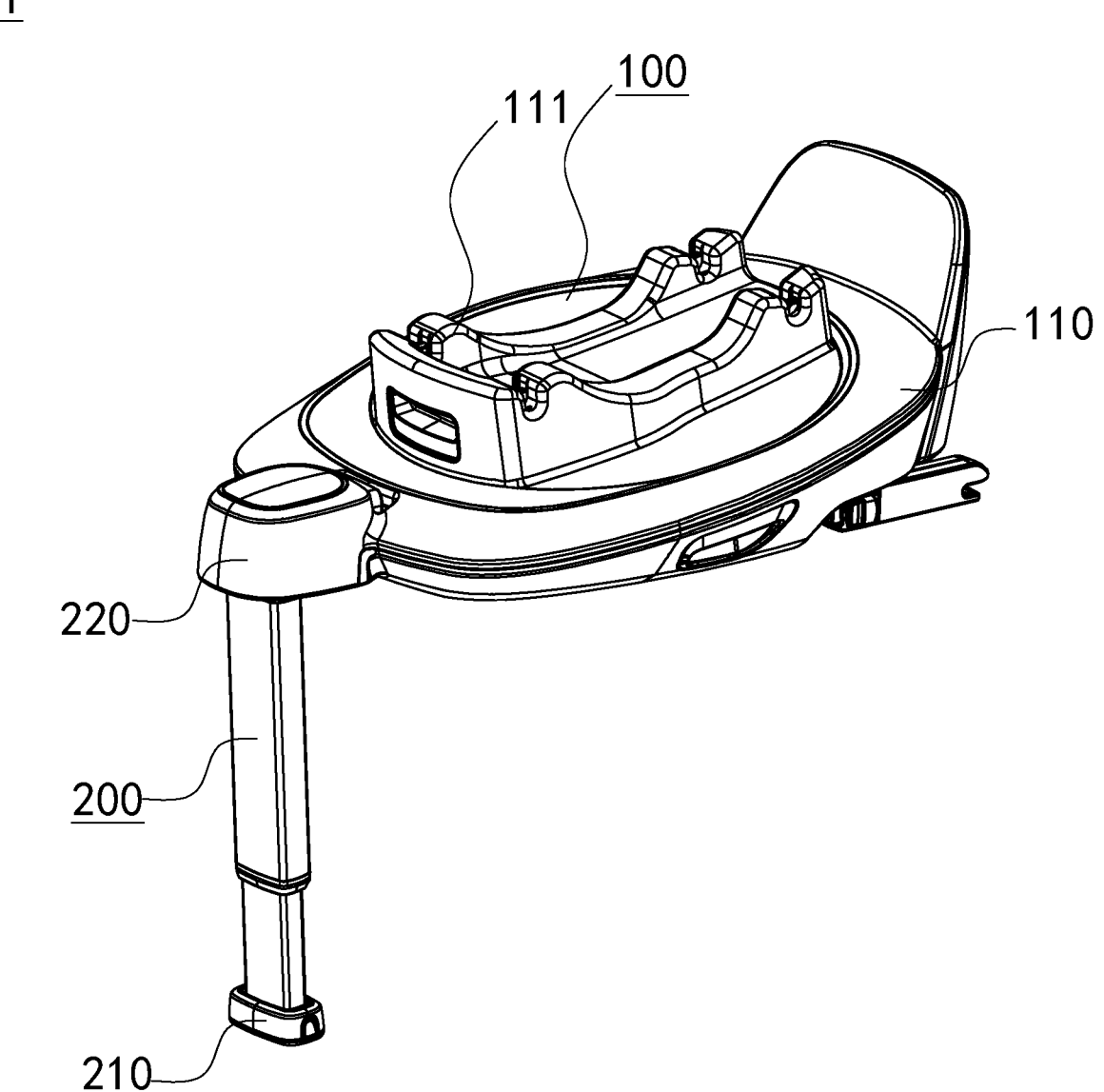
FIG. 1 is a perspective view of a base assembly of a child safety seat according to the disclosure, in which a support leg is in an unfolded state.

FIG. 1 is a perspective view of a base assembly 1 of a child safety seat according to the disclosure.

The disclosure provides a buffer structure 300 for unfolding/folding a support leg 200 of a child safety seat. The support leg 200 has a folded state and an unfolded state, and the support leg 200 is in the unfolded state in the example shown in FIG. 1. The buffer structure 300 is arranged between the support leg 200 and the base 100 of the child safety seat, and is positioned at a connecting portion between the support leg 200 and the base 100. According to the disclosure, when the support leg 200 rotates to from the unfolded state to the folded state or from the folded state to the unfolded state with respect to the base 100, the buffer structure 300 exerts a function that prevents the support leg 200 from rotating to the folded state or the unfolded state, thereby slowing down rotation of the support leg 200.

Specifically, the base assembly 1 according to the disclosure includes a base 100. The base 100 has a base body 110, and a seat (not shown) of the child safety seat is detachably arranged above the base body 110. The base body 110 has, on its upper side face, a seat connection limit portion 111 for connecting the seat. The seat connection limit portion 111 can be engaged to the seat through an engaging slot, for example. The base assembly 1 also includes, for example, a retractable support leg 200. The support leg 200 contacting with the vehicle floor can effectively ensure the stability of the child safety seat. In this example, the support leg 200 is rotatably fixed at a front side below the base 100 through a support leg connecting portion 130 (see FIG. 4). The support leg connecting portion 130 is covered by a covering portion 220 that plays a role of shielding and protection. A contacting portion 210 is arranged at a lower end of the support leg 200, and in the unfolded state shown in this example, the contacting portion 210 abuts against the vehicle floor, thereby enabling the child safety seat to keep stable.

Figure 2:
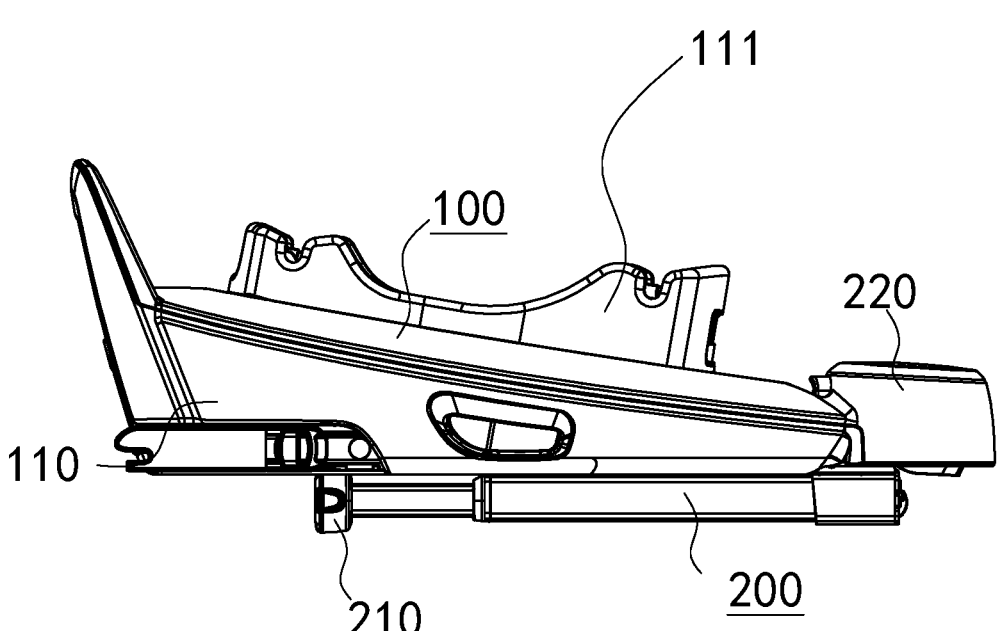
FIG. 2 is a side view of the base assembly according to the disclosure, in which the support leg is in a folded state.

FIG. 2 is a side view of the base assembly 1 according to the disclosure, in which the support leg 200 is in the folded state.

In the folded state, the consumer does not use the support leg, so the support leg 200 can be folded and stored in a bottom of the child safety seat. For example, the support leg 200 is pivoted backward and approximately attaches to a lower side face of the base 100.

Figure 3:
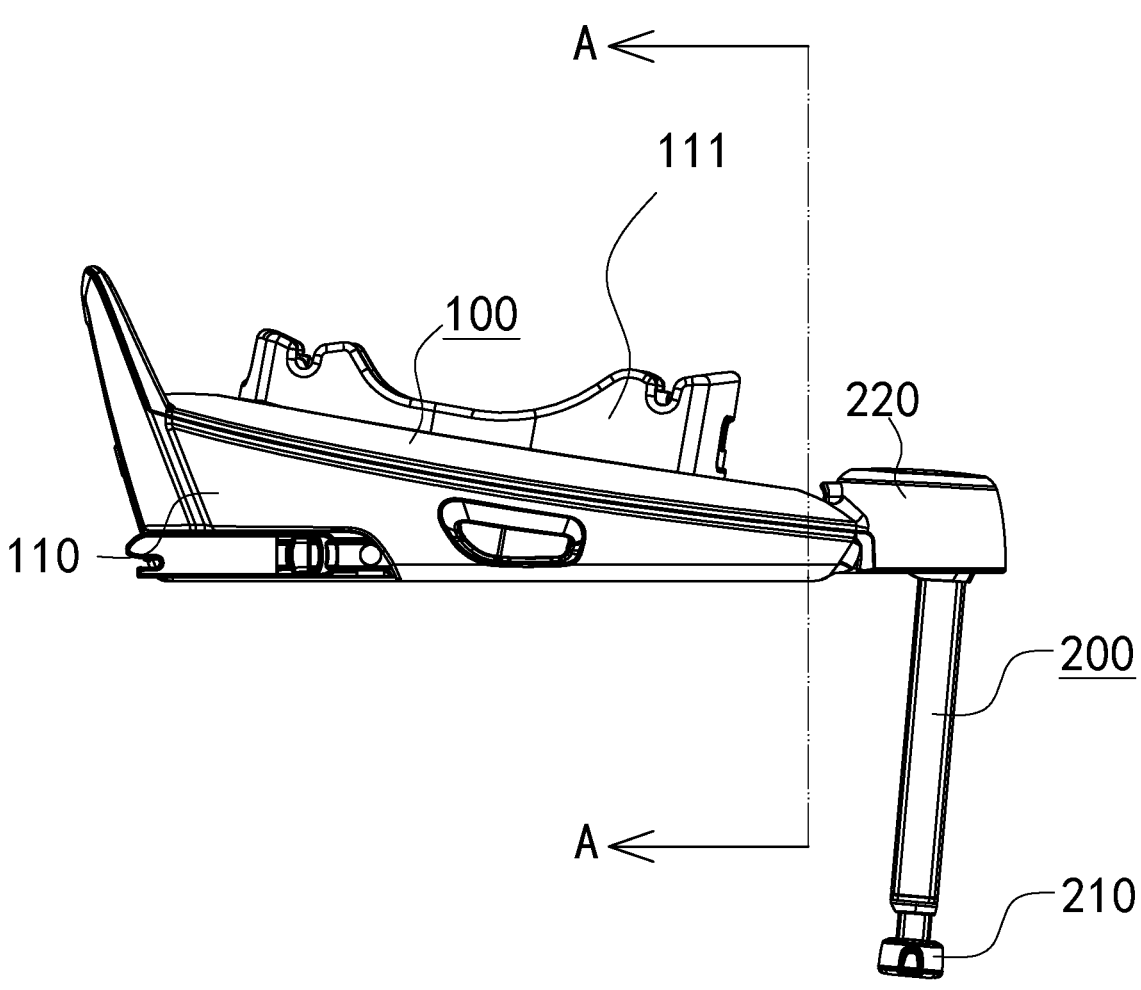
FIG. 3 is a side view of the base assembly according to the disclosure, in which the support leg is in the unfolded state.

FIG. 3 is a side view of the base assembly 1 according to the disclosure, in which the support leg 200 is in the unfolded state. In this example, the support leg 200 is pivoted forward around the support leg connecting portion 130 (see FIG. 4) between the support leg 200 and the base 100 from the folded state shown in FIG. 2, and finally reaches the unfolded state. According to the disclosure, the unfolded state is preferably such state where the lower side face of the contacting portion 210 of the support leg 200 completely abuts against the vehicle floor, in other words, the support leg 200 is substantially perpendicular to the vehicle floor.

Figure 4:
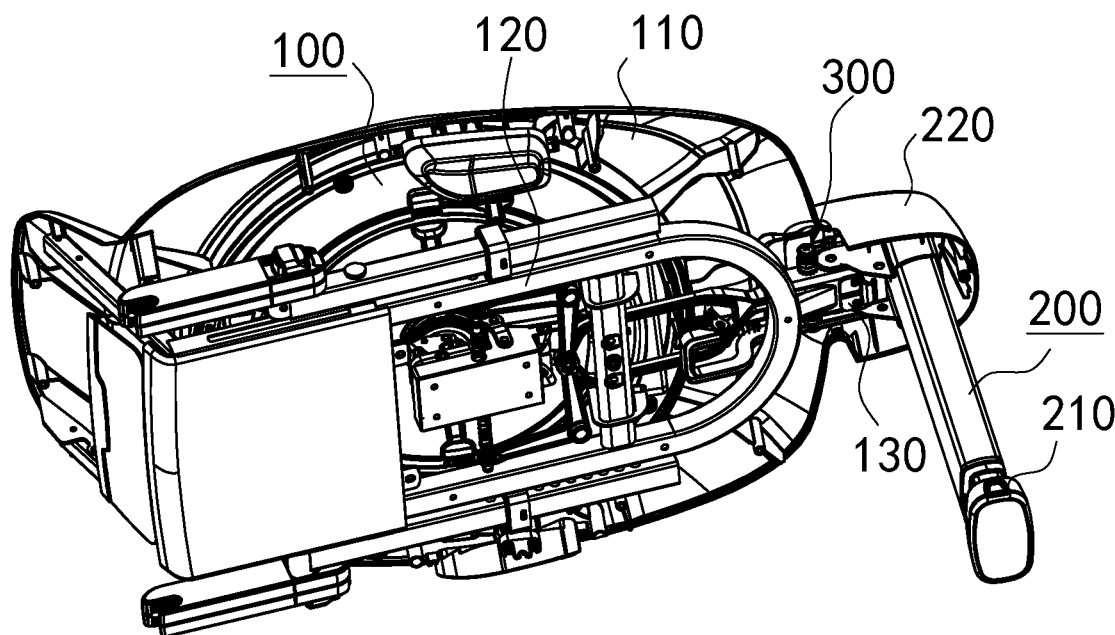
FIG. 4 is a lower perspective view of the base assembly according to the disclosure, in which the support leg is in the unfolded state.

FIG. 4 is a lower perspective view of the base assembly 1 according to the disclosure, in which the support leg 200 is in the unfolded state.

As can be seen in FIG. 4, a base bracket 120 is arranged below the base 100. The base bracket 120 can be in a form of a frame, and, for example, can be arranged inside the base, so as to reinforcing the strength of the entire base 100. In this example, the base bracket 120 is provided with a semi-arc portion at its front end, and the support leg connecting portion 130 between the support leg 200 and the base 100 is fixed to a top end of the semi-arc portion. According to the disclosure, the semi-arc portion at front end of the base bracket 120 can be integrally formed with or separately connected to other portions of the base bracket 120, such that, for example, an impact force occurring in a vehicle collide can be transmitted in a longitudinal direction of the seat, thereby better enhancing the mechanical strength of the base bracket 120, facilitating simple configuration of the base bracket 120 and avoiding sharp protrusions between various connecting portions. The support leg connecting portion 130 according to the disclosure is also functionally arranged for the support leg 200 to be pivoted with respect to the base 100.

Figure 5:
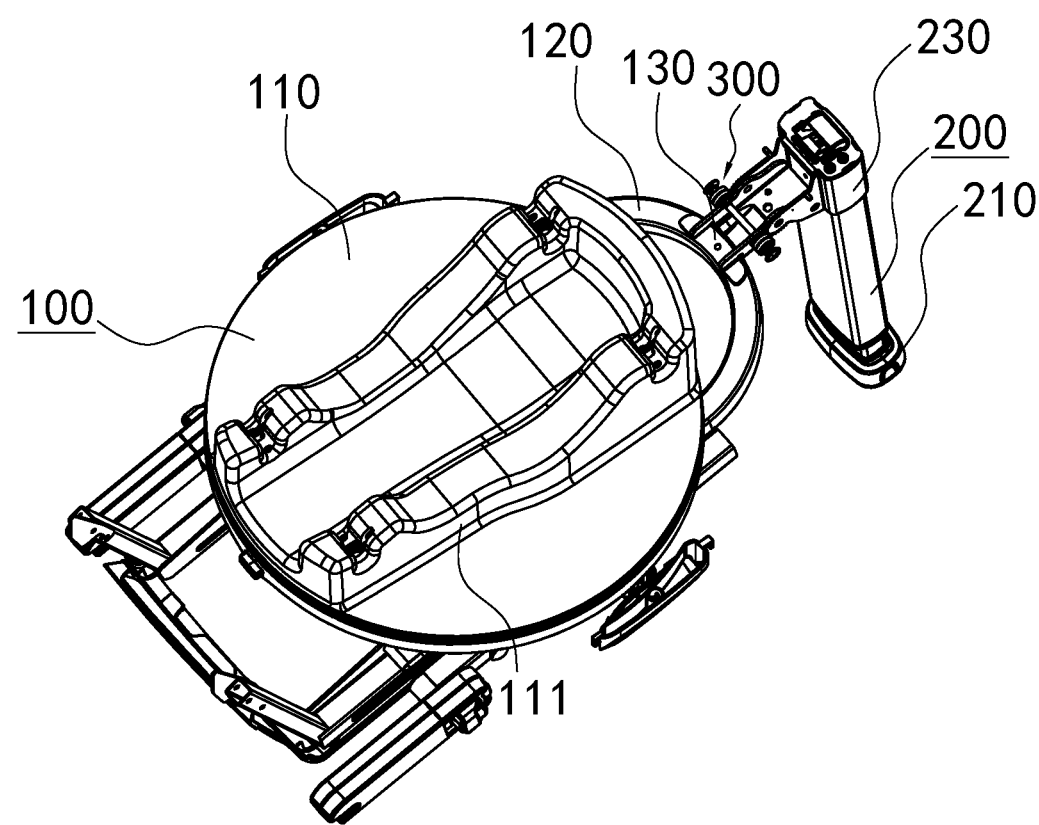
FIG. 5 is an upper perspective view of the base assembly according to the disclosure, in which the support leg is in the unfolded state.

FIG. 5 is an upper perspective view of the base assembly 1 according to the disclosure, in which the support leg 200 is in the unfolded state.

In order to better show the support leg 200 and the support leg connecting portion 130 of the base 100, the covering portion 220 above the support leg 200 is removed from the embodiment shown in FIG. 5 together with a housing of the base body 110. In this example, the support leg connecting portion 130 is arranged at the top end of the semi-arc portion of the base bracket 120, and the support leg connecting portion 130 is fixedly connected to the base bracket 120 by, e.g., welding, screwing, clamping or other connecting ways, and protrudes toward the front side of the child safety seat, so as is pivotably connected to the support leg 200.

In this example, the support leg 200 has a fixing device 230, such as a fixing iron sheet, at its upper end, so as to make the support leg 200 pivotably connected to the support leg connecting portion 130. Here, the fixing iron sheet is substantively in a U shape, and a bottom of the U shape surrounds and is fixedly connected to the upper end of the support leg 200, for example, by welding. Two wings of the U shape extend towards the support leg connecting portion 130 and are pivotably connected to the support leg connecting portion 130, such that the support leg 200 can be pivotally folded from the unfolded state to the folded state or pivotally unfolded from the folded state to the unfolded state.

In order to slow down the pivoting speed of the support leg 200, a buffer structure 300 is provided according to the disclosure. In this example, the buffer structure 300 is arranged on the support leg connecting portion 130, and its specific structure will be explained in detail below according to the attached drawings.

Figure 6:
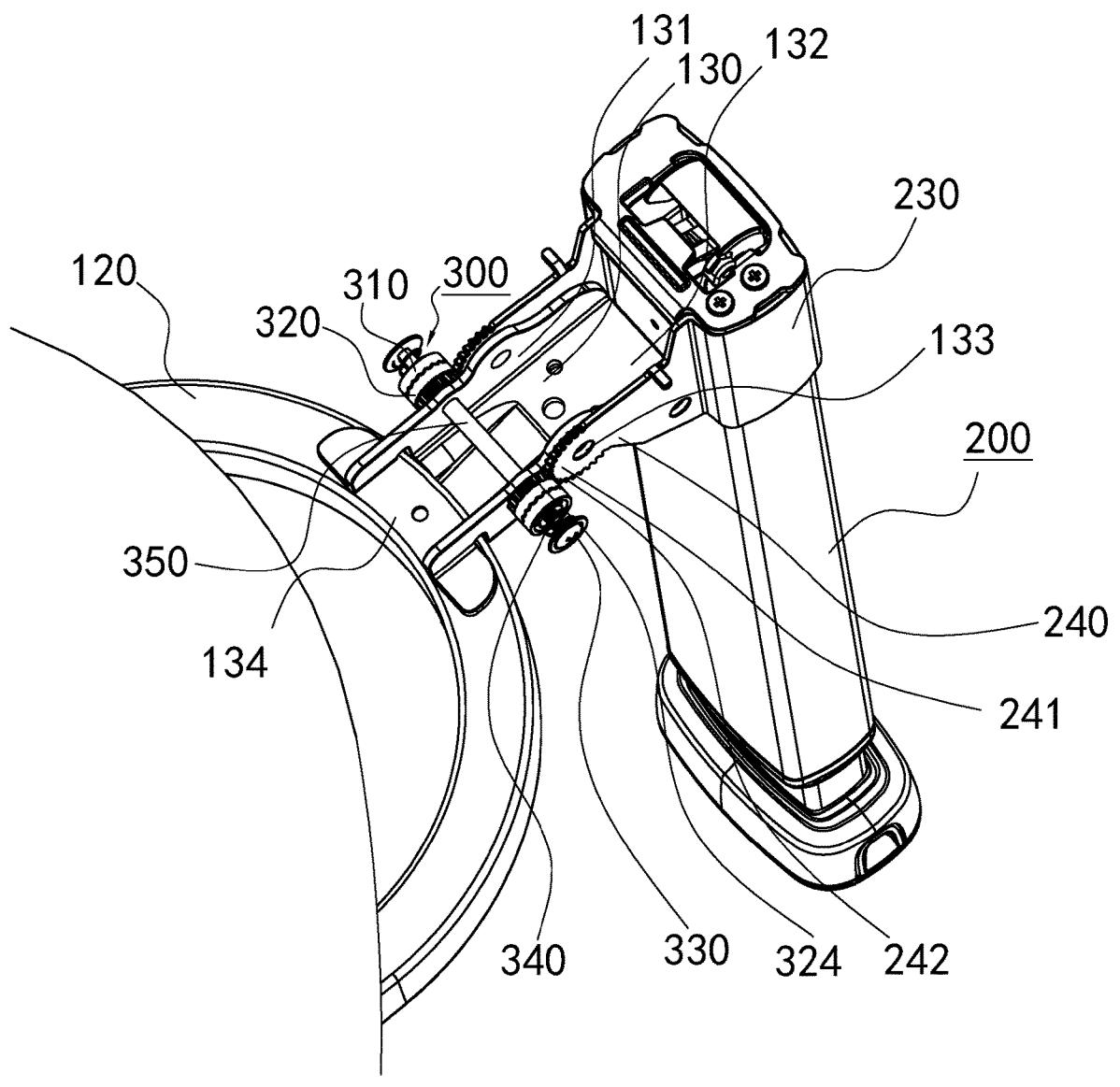
FIG. 6 is a perspective view of a buffer structure for unfolding/folding the support leg of the base assembly according to the disclosure, in which the support leg is in the unfolded state.

FIG. 6 is a perspective view of the buffer structure 300 for unfolding/folding of the support leg of the base assembly according to the disclosure, in which the support leg 200 is in the unfolded state.

In FIG. 6, exemplary details of the support leg 200 and the support leg connecting portion 130 of the base 100 are shown in an enlarged manner. According to this example, the support leg connecting portion 130 includes a bottom 132, and two side walls 131 extending upward from both sides of the bottom 132. Perforations 133 are arranged in pairs in the two side walls 131. In this example, at least two pairs of corresponding perforations 133 are arranged in the side walls. Among them, one pair of the perforations is used for fixing a fixed rod 350 of the buffer structure 300 (the fixed rod 350 transversely passes through and is fixed to the support leg connecting portion 130, which serve to connect the support leg 200, of the base 100), and the other pair of the perforations is arranged for connecting pivoting portions 241 of a support leg side jointing device 240 of the support leg 200. The two side walls 131 of the support leg connecting portion 130 are pivotably connected to the fixing device 230 of the support leg 200, e.g., to the two wings of the U-shaped fixing iron sheet by, for example, screws, shafts and the like. At one end, the support leg connecting portion 130 is engaged to the base bracket 120, and is fixed to the base bracket 130 by using, for example, screws and/or welding, and by an auxiliary connecting sheet 134 if necessary. Moreover, at the other end away from the base bracket 120, the support leg connecting portion 130 is connected to the fixing iron sheet 230 of the support leg 200 through the support leg side jointing device 240, such that the support leg 200 can be unfolded or folded with respect to the base 100. In this embodiment, the support leg side jointing device 240 and the fixing iron sheet 230 are a single integral component, for example, the support leg side jointing device 240 and the fixing iron sheet 230 are an iron sheet integrally formed.

According to the disclosure, the buffer structure 300 is arranged between the support leg 200 and the base 100 for slowing down rotation of the support leg 200. In this example, the buffer structure 300 includes a fixed rod 350 and base-side pivoting devices 320. By using the perforations arranged in the side walls 131, the fixed rod 350 passes through the support leg connecting portion 130 of the base 100 for connecting the support leg 200 and is fixed on the support leg connecting portion 130. The base-side pivoting devices 320 are rotatably sleeved on the fixed rod 350, and cooperates with the support leg side jointing device 240 pivotally connected to the support leg connecting portion 130, so as to slow down rotation of the support leg 200.

According to an embodiment, the base-side pivoting devices 320 are arranged to be base gears, and each of the base gears is provided with jointing teeth 324 uniformly distributed along a portion or entire circumference thereof, furthermore, the support leg side jointing device 240 is accordingly provided with jointing teeth 242 uniformly distributed along a portion or entire circumference thereof. The jointing teeth 324 of the base gears 320 and the jointing teeth 242 of the support leg side jointing device 240 are engaged to each other, such that the base gears 320 can rotate following rotation of the support leg 200. According to the disclosure, the jointing teeth 242 are arranged on the pivoting portions 241 of the support leg side jointing device 240, and the pivoting portions 241 are arranged on free ends of the two wings of the U-shaped fixing iron sheet. According to a preferred embodiment, a gear diameter of each of the base gears 320 with the jointing teeth 324 is smaller a diameter of each of the pivoting portions 241 with the jointing teeth 242 of the support leg side jointing device 240, which is beneficial to reduce rotation speed of the support leg 200.

According to the disclosure, the buffer structure 300 further includes a buffer member 310, a reset member 340, and a positioning member 330. In this example, the buffer member 310 is sleeved on the fixed rod 350 and abuts against the base gears 320, and can slide on the fixed rod 350 but cannot rotate with respect to the fixed rod 350, wherein the buffer member 310 and the base gear 320 are pressed against each other on opposing sides, so as to restrain pivoting of the base gears 320 with respect to the base 100. For example, devices capable of increasing resistance to rotation or devices capable of restraining rotation, such as engaging teeth being engaged with each other may be arranged on opposing sides (see FIGS. 7, 8 for details). The reset member 340 is arranged on a facing away side of the buffer member 310 facing away from the base gears 320 for biasing the buffer member 310, such that the buffer member 310 obstructs pivoting of the base gears 320 and slows down rotation speed of the support leg 200. The positioning member 330 is arranged on an end side 351 of the fixed rod 350 for positioning the reset member 340, and the reset member 340 is arranged between the buffer member 310 and the positioning member 330.

In this example, the reset member 340, such as a coil spring, is sleeved on the fixed rod 350. One end of the reset member 340 acts on the buffer member 310, and the other end abuts against the positioning member 330, preferably fixedly connected to the positioning member 330, thereby utilizing biasing action to maintain interaction, such as mutual contact, between the buffer member 310 and the base gears 320, restraining rotation of the base gears 320 with respect to the support leg connecting portion 130.

According to this example, a base gear 320, a buffer member 310, a reset member 340, and a positioning member 330 are respectively arranged on each of two sides of the support leg connecting portion 130, but it may also be arranged that just one set of these related components is provided on only one side.

Figure 7:
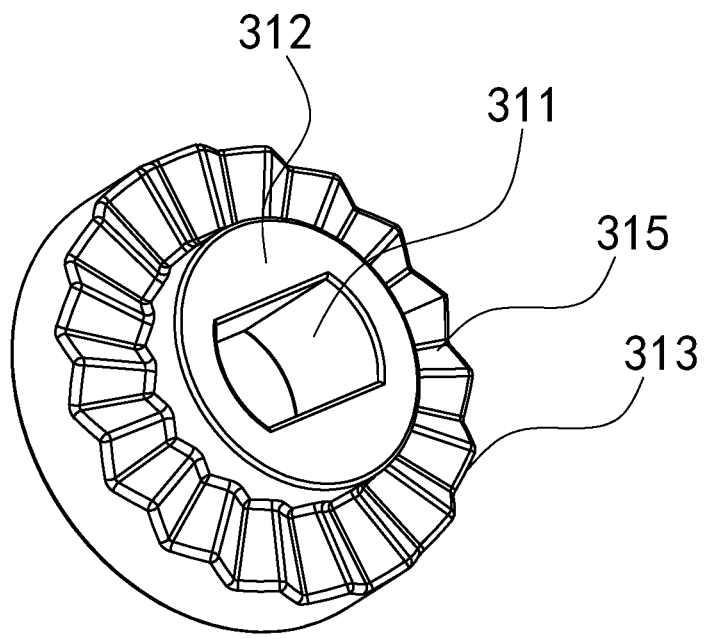
FIG. 7 is a perspective view of a buffer member of the buffer structure according to the disclosure.
Figure 8:
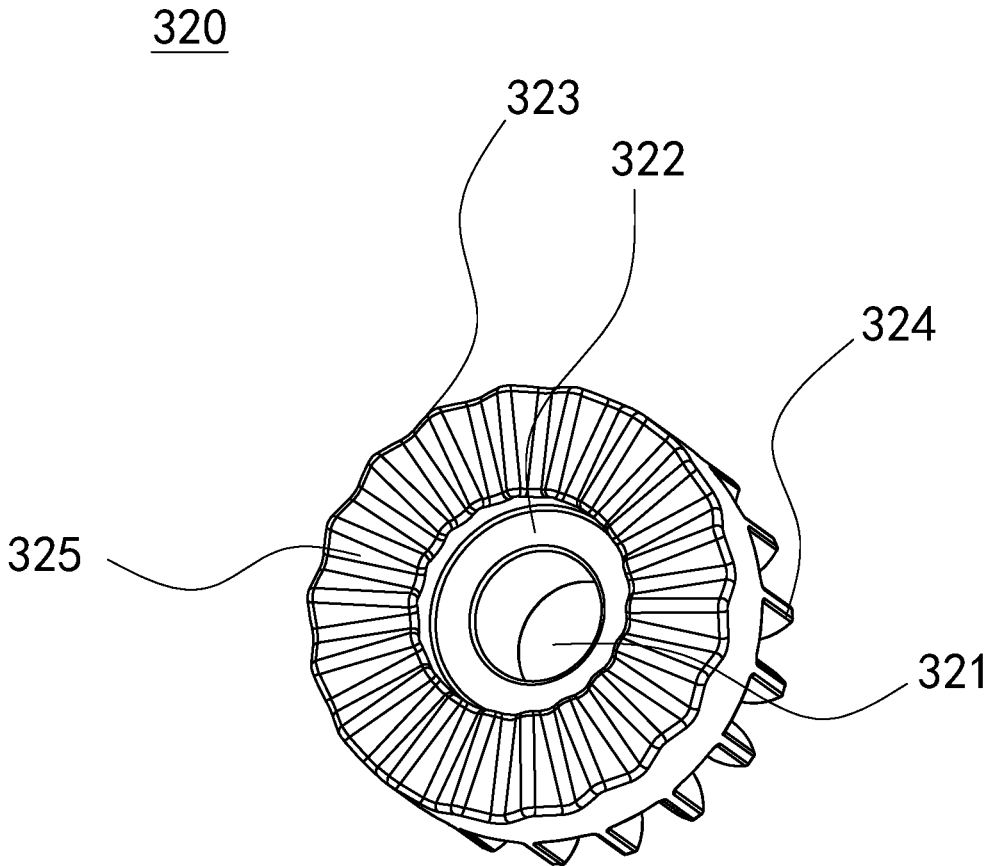
FIG. 8 is a perspective view of a base gear of the buffer structure according to the disclosure.

FIG. 7 is a perspective view of a buffer member 310 of the buffer structure 100 according to the disclosure. FIG. 8 is a perspective view of a base gear 320 of the buffer structure 100 according to the disclosure.

FIG. 7 shows a side 315 of the buffer member 310 facing the base gear 320, i.e., an opposing side to the base gear 320, and on this opposing side, the buffer member 310 has a bulge 312. FIG. 8 shows a side 325 of the base gear 320 facing buffer member 310, i.e., an opposing side to the buffer member 310, and on this opposing side, the base gear 320 has a recess 322 corresponding to the bulge 312. The bulge 312 and the recess 322 are embedded to each other in a form-fitting manner and their shape is, for example, circular. In this example, a center of the buffer member 310 and a center of the base gear 320 are respectively provided with corresponding openings 311, 321. The opening 311 of the buffer member 310 has a flat portion, and the flat portion will cooperate with a corresponding flat portion on the fixed rod 350 after the buffer member 310 is sleeved on the fixed rod 350, such that the buffer member 310 can slide on the fixed rod 350 and the buffer member 310 cannot rotate with respect to the fixed rod 350. Accordingly, the opening 321 of the base gear 320 has a circular shape, such that it can freely rotate on the fixed rod 350.

According to an embodiment, the buffer member 310 and the base gear 320 have alternate convex and concave engaging teeth 313, 323 uniformly distributed in a circumferential direction on opposing sides, respectively. The engaging teeth 313, 323 extend radially. Preferably, wavy engaging teeth 313, 323 are continuously distributed on the opposing sides of the buffer member 310 and the base gear 320 respectively surrounding the bulge 312 and the recess 322, such that the buffer member 310 and the base gear 320 are engaged to each other by using the engaging teeth 313, 323. When the base gear 320 is brought by the jointing teeth 242 of the support leg side jointing device 240 to rotate, the base gear 320 overcomes the engaging force between the engaging teeth 313, 323, such that the engaging teeth 313, 323 are temporarily separated from being engaged by each other. As the base gear 320 continue to rotate, since the reset member 340 causes the buffer member 310 to be always biased in a direction towards the base gear 320, the engaging teeth 323 of the base gear 320 will be engaged to a next one of the engaging teeth 313 of the buffer member 310 again. Through such continuous process, the buffer member 310 can effectively slow down rotation speed of the base gear 320.

According to this example, the buffer member 310 is of a split design, for example, a two-piece design, and it becomes a complete buffer member 310 by jointing. The base gear 320 is of a split design, for example, a two-piece design, and it becomes a complete base gear 320 by jointing. With such design, the buffer member 310 and the base gear 320 can be easily disassembled and replaced, e.g., after installation is completed. According to another embodiment, the buffer member 310 can be integrally designed, and the base gear 320 can also be integrally designed, and they are respectively sleeved on the fixed rod 350 from the end side 351. According to the disclosure, both the buffer member 310 and the base gear 320 are disc-shaped and have basically same outer circumferential profile, and the engaging teeth 313 of the buffer member 310 on an opposing side and the engaging teeth 323 of the base gear 320 on the opposing sides may also have different distribution densities in the circumferential direction.

Figure 9:
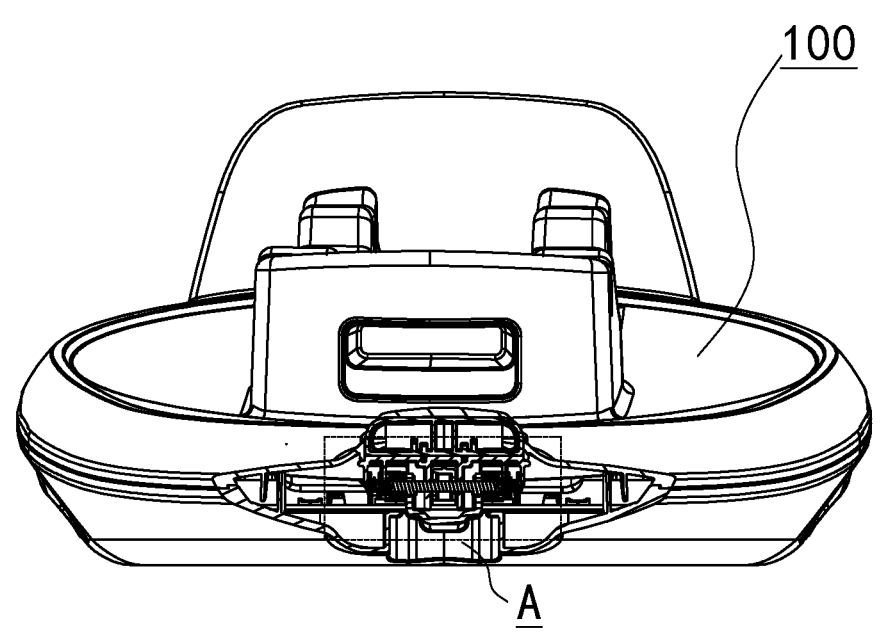
FIG. 9 is a partial cross-sectional view of the base assembly according to the disclosure.
Figure 10:
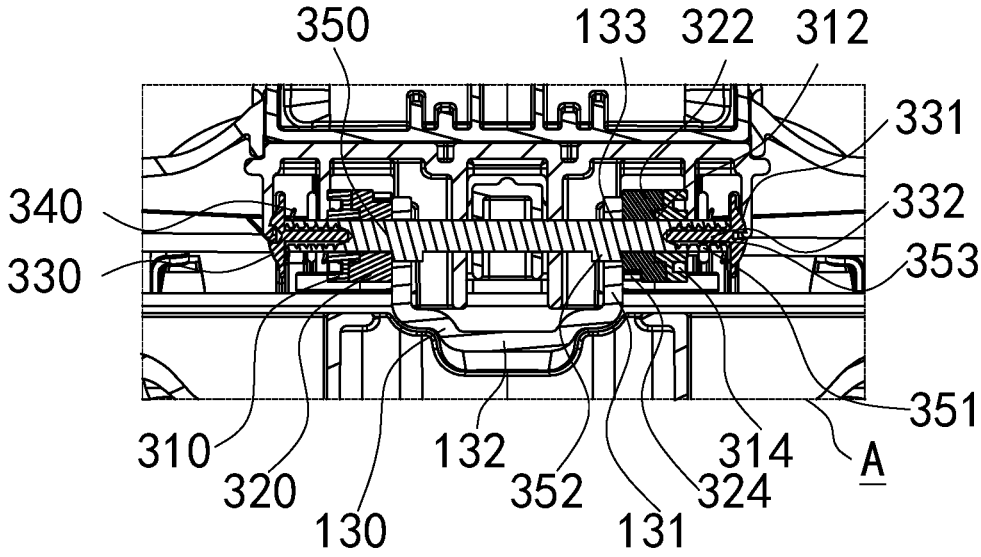
FIG. 10 is a detailed view of the region A in FIG. 9 according to the disclosure.

FIG. 9 is a partial cross-sectional view of the base assembly 1 according to the disclosure, its front end is cut along the AA section line in FIG. 3. FIG. 10 is an enlarged detail view of the region A shown in FIG. 9.

In FIG. 10, the support leg connecting portion 130 of the base 100 can be seen. The support leg connecting portion 130 is basically U-shaped and includes a bottom 132 and two side walls 131. There are perforations 133 in the side walls 131, respectively. In this example, the fixed rod 350 passes through the perforations 133, and its two end sides 351 are respectively located outside the side walls 131. At positions of the perforations 133, the fixed rod 350 is fixed in the side walls 131 through a fixed portion 352, so as to prevent the fixed rod 350 from rotating with respect to the support leg connecting portion 130. A base gear 320, a buffer member 310, a coil spring 340, and a positioning member 330 are subsequently sleeved on an outer side of each of the side walls 131, respectively. The positioning member 330 is, for example, a screw, and has a head 331 and a connecting rod 332. The head 331 abuts against or is fixed at one end of the coil spring 340, and the connecting rod 332 is inserted into the fixed rod 350 from the end side 351 of the fixed rod 350 and fixed (exemplary shown on the left side), or screwed via thread into a connecting rod receiving portion 353 of the fixed rod 350 (exemplary shown on the right side). The other end of the coil spring 340 is butted against a side of the buffer member 310 facing away from the base gear 320, preferably butted against or fixed in a reset member receiving portion 314 arranged in this side, so as to better guide and fix the coil spring, and the reset member receiving portion 314 is, for example, arranged as a groove around the central opening 311. Thus, when the base gear 320 is pivoted with respect to the support leg connecting portion 130, the coil spring 340 always gives the buffer member 310 a biasing force toward the base gear 320, thereby making the base gear 320 never separate from contacting with the buffer member 310, and thus reducing pivoting speed of the base gear 320. It can also be seen from this example that the bulge 312 and the recess 322 are in an engaged state, the engaged bulge 312 and recess 322 are beneficial for the buffering cooperation between the base gear 320 and the buffer member 310, thus avoiding uncontrolled teeth separation.

To sum up, when the child safety seat needs to unfold or fold the support leg 200, the jointing teeth 242 of the support leg side jointing device 240 of the support leg 200 brings the base gears 320 to rotate, meanwhile, since the buffer member 310 is engaged with the base gears 320 under the action of the reset member 340, the rotation resistance of the base gears 320 will be increased, and the rotation of the support leg 200 will be slowed down simultaneously, such that impact noise caused by free folding and folding of the support leg 200 will not occur.

Since this application can be embodied in various forms without departing from the spirit and essence of the application, it should be understood, the above-mentioned embodiments are not limited to any of the foregoing details, but should be interpreted in the broadest sense within the scope defined by the claims. Therefore, all changes that fall within the scope of the claims or their equivalents should be covered by the claims.

LIST OF REFERENCE SIGNS

1: Base Assembly
100: Base
   110: Base Body
      111: Seat Connection Limit Portion
   120: Base Bracket
   130: Support Leg Connecting Portion
      131: Side Wall
      132: Bottom
      133: Perforation
      134: Auxiliary Connecting Sheet
200: Support Leg
   210: Contacting Portion
   220: Covering Portion
   230: Fixing Device (e.g., Fixing Iron Sheet)
   240: Support Leg Side Jointing Device
      241: Pivoting Portion
      242: Jointing Teeth
300: Buffer Structure
   310: Buffer Member
      311: Opening
      312: Bulge
      313: Engaging Teeth
      314: Reset Member Receiving Portion
      315: Side
   320: Base-side Pivoting Device (e.g., Base Gear)
      321: Opening
      322: Recess
      323: Engaging Teeth
      324: Jointing Teeth
      325: Side
   330: Positioning Member
      331: Head
      332: Connecting Rod
   340: Reset Member (e.g., Coil Spring)

350: Fixed Rod
      351: End Side
      352: Fixed Portion
      353: Connecting Rod Receiving Portion

What is claimed is:

1. A base assembly comprising:
a base;
a support leg of a child safety seat pivotably connected to the base; and
a buffer structure for the support leg,
wherein the buffer structure is located at a connecting portion between the support leg and the base,
wherein, when the support leg rotates from an unfolded state to a folded state or from the folded state to the unfolded state with respect to the base, the buffer structure interferes with rotation of the support leg, thereby slowing down the rotation of the support leg, and
wherein the buffer structure comprises a base-side pivoting device pivotably connected to the base and cooperating with a support leg side jointing device of the support leg pivotably connected to the base.

2. The base assembly according to claim 1, wherein the buffer structure further comprises:
a buffer member opposed to the base-side pivoting device along an axial direction of the base-side pivoting device and slidable with respect to the base-side pivoting device along the axial direction of the base-side pivoting device,
wherein an opposing surface of the buffer member is pressed against an opposing surface of the base-side pivoting device.

3. The base assembly according to claim 1,
wherein the support leg is pivotably connected to the support leg connecting portion of the base through a fixing device, and
wherein the fixing device is connected to the support leg side jointing device or constitutes the support leg side jointing device.

4. A child safety seat comprising the base assembly according to claim 1.

5. The base assembly according to claim 1, wherein the buffer structure comprises:
a fixed rod, transversely passing through and being fixed to a support leg connecting portion of the base for connecting to the support leg,
wherein the base-side pivoting device is pivotably sleeved on the fixed rod, and
wherein the support leg side jointing device is pivotably connected to the support leg connecting portion.

6. The base assembly according to claim 5, wherein the buffer structure further comprises:
a buffer member sleeved on the fixed rod and being abutting against the base-side pivoting device and slidable on the fixed rod without rotating with respect to the fixed rod,
wherein opposing surfaces of the buffer member and the base-side pivoting device are pressed against each other.

7. The base assembly according to claim 6, wherein the buffer structure further comprises:
a reset member arranged on a side of the buffer member facing away from the base-side pivoting device for biasing the buffer member toward the base-side pivoting device.

8. The base assembly according to claim 7, wherein the buffer structure further comprises:

a positioning member fixed on the fixed rod for positioning the reset member.

9. The base assembly according to claim 8, wherein the positioning member is arranged on an end side of the fixed rod, and wherein the reset member is arranged between the buffer member and the positioning member.

10. The base assembly according to claim 8, wherein the reset member is a coil spring sleeved on an end of the fixed rod, wherein the positioning member has a head and a connecting rod, wherein the head abuts against one end of the reset member, and wherein the connecting rod serves to connect and fix the positioning member to the fixed rod.

11. The base assembly according to claim 6, wherein two ends of the fixed rod protrude from two sides of the support leg connecting portion respectively, and wherein the base-side pivoting device and the buffer member are sequentially arranged at the two ends of the fixed rod from inside to outside respectively.

12. The base assembly according to claim 1, wherein jointing teeth distributed in a circumferential direction are arranged on the base-side pivoting device, wherein jointing teeth distributed in the circumferential direction are correspondingly arranged on the support leg side jointing device, and wherein the jointing teeth on the base-side pivoting device and the jointing teeth on the support leg side jointing device are configured to be engaged to each other.

13. The base assembly according to claim 12, wherein the jointing teeth on the base-side pivoting device are distributed along an entire circumference.

14. The base assembly according to claim 12, wherein the jointing teeth on the base-side pivoting device are uniformly distributed along a circumference.

15. The base assembly according to claim 12, wherein the jointing teeth on the support leg side jointing device are distributed along a portion of a circumference.

16. The base assembly according to claim 12, wherein the jointing teeth on the support leg side jointing device are uniformly distributed along a circumference.

17. The base assembly according to claim 12, wherein a diameter of a gear with the jointing teeth of the base-side pivoting device is smaller than a diameter of a gear with the jointing teeth of the support leg side jointing device.

18. The base assembly according to claim 1, wherein the buffer structure further comprises:

a buffer member abutting against the base-side pivoting device and being slidable with respect to the base-side pivoting device along an axial direction of the base-side pivoting device.

19. The base assembly according to claim 18, wherein the buffer member has bulge on the opposing side of the buffer member, wherein the base-side pivoting device has a recess at a corresponding position on the opposing side of the base-side pivoting device, and wherein the bulge and the recess are embedded to each other.

20. The base assembly according to claim 18, wherein the buffer member and the base-side pivoting device have opposing sides that oppose each other and having engaging teeth alternate between convex and concave portions.

21. The base assembly according to claim 20, wherein the engaging teeth extend radially.

22. The base assembly according to claim 20, wherein the engaging teeth are uniformly distributed in the circumferential direction.

23. The base assembly according to claim 20, wherein the engaging teeth on the opposing side of the buffer member and the engaging teeth on the opposing side of the base-side pivoting device have different distribution densities in the circumferential direction.

24. The base assembly according to claim 18, wherein the buffer member is not capable of rotating with respect to the base-side pivoting device.

25. The base assembly according to claim 18, wherein the buffer structure further comprises:

a reset member arranged on a side of the buffer member facing away from the base-side pivoting device for biasing the buffer member toward the base-side pivoting device.

26. The base assembly according to claim 25, wherein, on the side of the buffer member facing away from the base-side pivoting device, the buffer member has a reset member receiving portion for receiving and fixing the other end of the reset member.

* * * * *